United States Patent
Yang et al.

(10) Patent No.: US 9,226,185 B2
(45) Date of Patent: Dec. 29, 2015

(54) CELL MEASUREMENT METHOD AND TERMINAL

(75) Inventors: Yoonoh Yang, Anyang-si (KR); Kyungsoo Woo, Anyang-si (KR); Suhwan Lim, Anyang-si (KR); Minsoo Kim, Anyang-si (KR); Sukhyon Yoon, Anyang-si (KR); Sangwook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 13/813,585

(22) PCT Filed: Feb. 16, 2012

(86) PCT No.: PCT/KR2012/001165
§ 371 (c)(1),
(2), (4) Date: Jan. 31, 2013

(87) PCT Pub. No.: WO2013/005904
PCT Pub. Date: Jan. 10, 2013

(65) Prior Publication Data
US 2013/0128765 A1    May 23, 2013

Related U.S. Application Data

(60) Provisional application No. 61/503,616, filed on Jul. 1, 2011.

(51) Int. Cl.
*G01R 31/08* (2006.01)
*H04W 24/10* (2009.01)
(Continued)

(52) U.S. Cl.
CPC ............... *H04W 24/10* (2013.01); *H04W 24/00* (2013.01); *H04L 5/005* (2013.01); *H04L 5/0073* (2013.01); *H04W 36/0094* (2013.01); *H04W 48/16* (2013.01)

(58) Field of Classification Search
CPC ...... H04W 24/00; H04W 80/04; H04W 84/12
USPC .................. 370/252, 328, 338, 401
See application file for complete search history.

(56) References Cited

U.S. PATENT DOCUMENTS 8,665,761 B2   3/2014  Seo et al.
2009/0156225 A1*  6/2009  Angelow et al. ............. 455/450
(Continued)

FOREIGN PATENT DOCUMENTS

KR   10-2010-0082291 A   7/2010
KR   10-2010-0091871 A   8/2010

OTHER PUBLICATIONS

3GPP TS 36.331, V10.2.0 (Jun. 2011), 3rd Generation Partnership Project; Technical Specification Group Radio Access Network; Evolved Universal Terrestrial Radio Access (E-UTRA); Radio Resource Control (RRC); Protocol Specification (Release 10), Jun. 2006, 295 pages.

(Continued)

*Primary Examiner* — Ricky Ngo
*Assistant Examiner* — Christine Ng
(74) *Attorney, Agent, or Firm* — Birch, Stewart, Kolasch & Birch, LLP

(57) ABSTRACT

A cell measurement method of a User Equipment (UE) is disclosed. The cell measurement method may include receiving a radio resource configuration dedicated Information Element (IE) and a measurement object from a serving cell. The radio resource configuration dedicated IE may include first information about a measurement resource restriction pattern for a first cell and the measurement object may include a neighbor cell configuration IE for indicating MBMS Single Frequency Network (MBSFN) configurations of one or more neighbor cells. The measurement object may further include second information about a resource restriction pattern indicating subframes on which restriction is imposed in Reference Signal Received Power (RSRP) or Reference Signal Received Quality (RSRQ) measurements of one or more neighbor cells and a list of one or more neighbor cells to which the second information is applied. If the MBSFN configurations of the one or more neighbor cells are not known or not explicitly indicated by the neighbor cell configuration IE, the method may further include determining that the subframes indicated by the second information have not been configured as MBSFN subframes for the one or more neighbor cells listed in the list.

13 Claims, 20 Drawing Sheets

(51) Int. Cl.
  *H04W 24/00*  (2009.01)
  *H04W 36/00*  (2009.01)
  *H04W 48/16*  (2009.01)
  *H04L 5/00*  (2006.01)

(56) References Cited

U.S. PATENT DOCUMENTS

2009/0312008 A1* 12/2009 Lindoff et al. ............... 455/423
2011/0267993 A1   11/2011 Seo et al.
2012/0231790 A1*  9/2012 Lindoff et al. ............... 455/434
2013/0182583 A1*  7/2013 Siomina et al. .............. 370/252
2014/0064133 A1*  3/2014 Kazmi et al. ................. 370/252

OTHER PUBLICATIONS

Alcatel-Lucent Shanghai Bell et al., "Specification Considerations Related to ABS for RLM and RSRP/RSRQ Measurements," Agenda Item 6.2.6., 3GPP TSG RAN WG1 #63bis Meeting, R1-110228, Jan. 17-21, 2011, Dublin, Ireland, 3 pages.
LG Electronics, "Resource Specific RRM," Agenda Item 6.2.6, 3GPP TSG RAN WG1 Meeting #63bis, R1-110382, Jan. 17-21, 2011, Dublin, Ireland, 2 pages.

* cited by examiner

CELL MEASUREMENT METHOD AND TERMINAL

This application is the National Phase of PCT/KR2012/001165 filed on Feb. 16, 2012, which claims priority under 35 U.S.C. 119(e) to US Provisional Application No. 61/503,616 filed on Jul. 1, 2011, all of which are hereby expressly incorporated by reference into the present application.

TECHNICAL FIELD

The present invention relates to cell measurement.

BACKGROUND ART

Future-generation multimedia wireless communication systems under recent active study are required to additionally process and transmit various types of information including video and wireless data, beyond the traditional voice service. The wireless communication systems aim at reliable communication for a plurality of users irrespective of their locations and mobility. However, a wireless channel experiences a number of problems such as path loss, shadowing, fading, noise, a limited bandwidth, limited power of terminals, and interference between users. Other challenges faced in designing a wireless communication system include resource allocation, mobility issues related to fast changing physical channels, portability, security, and privacy.

When a transmission channel experiences deep fading, a receiver has difficulty in determining a transmitted signal unless another version or a replica of the transmitted signal is transmitted additionally. Resources corresponding to another version or a replica are called diversity and diversity is one of the most significant factors contributing to reliable transmission on a wireless channel. Use of the diversity can maximize data transmission capacity or data transmission reliability. A system that implements diversity by means of multiple Transmission (Tx) antennas and multiple Reception (Rx) antennas is called a Multiple Input Multiple Output (MIMO) system.

The MIMO system implements diversity by Space Frequency Block Code (SFBC), Space Time Block Code (STBC), Cyclic Delay Diversity (CDD), Frequency Switched Transmit Diversity (FSTD), Time Switched Transmit Diversity (TSTD), Precoding Vector Switching (PVS), Spatial Multiplexing (SM), etc.

One of systems that have been considered as promising successors to $3^{rd}$ Generation (3G) systems is Orthogonal Frequency Division Multiplexing (OFDM) that can mitigate inter-symbol interference with low complexity. In OFDM, an input serial data stream is converted to N parallel data and transmitted on N orthogonal subcarriers. Orthogonality is maintained among the subcarriers in the frequency domain. Orthogonal Frequency Division Multiple Access (OFDMA) is a multiple access scheme that achieves multiple access by independently allocating a part of available subcarriers to each user in a system using OFDM as a modulation scheme.

FIG. 1 illustrates a wireless communication system.

Referring to FIG. 1, the wireless communication system includes at least one Base Station (BS) 20. Each BS 20 provides communication service to a specific geographical area (generally called a cell) 20a, 20b or 20c. Each cell may further be divided into a plurality of areas (called sectors). A User Equipment (UE) 10 may be fixed or mobile. The term UE may be replaced with Mobile Station (MS), User Terminal (UT), Subscriber Station (SS), wireless device, Personal Digital Assistant (PDA), wireless modem, handheld device, etc. The BS 20 is generally a fixed station communicating with the UE 10 and the term BS is interchangeable with evolved Node B (eNB), Base Transceiver System (BTS), Access Point (AP), etc.

Downlink (DL) refers to communication from a BS to a UE and Uplink (UL) refers to communication from a UE to a BS. A transmitter may be a part of a BS and a receiver may be a part of a UE, on downlink, whereas the transmitter may be part of the UE and the receiver may be part of the BS, on uplink.

The wireless communication system may be any of a MIMO system, a Multiple Input Single Output (MISO) system, a Single Input Single Output (SISO) system, and a Single Input Multiple Output (SIMO) system. The MIMO system uses a plurality of Tx antennas and a plurality of Rx antennas. The MISO system uses a plurality of Tx antennas and a single Rx antenna. The SISO system uses a single Tx antenna and a single Rx antenna. The SIMO system uses a single Tx antenna and a plurality of Rx antennas.

Hereinbelow, a Tx antenna refers to a physical or logical antenna used for transmitting one signal or stream and an Rx antenna refers to a physical or logical antenna used for receiving one signal or stream.

A $3^{rd}$ (Generation Partnership Project Long Term Evolution (3GPP LTE) system employs MIMO.

FIG. 2 illustrates the structure of a radio frame in the 3GPP LTE system.

Referring to FIG. 2, a radio frame is divided into 10 subframes, each subframe including two slots. The slots of a radio frame are numbered from 0 to 19. A unit time during which one subframe is transmitted is defined as Transmission Time Interval (TTI). A TTI may be considered to be a scheduling unit for data transmission. For example, one radio frame may be 10 ms long, one subframe may be 1 ms long, and one slot may be 0.5 ms long.

This radio frame structure is purely exemplary and thus the number of subframes in a radio frame or the number of slots in a subframe may vary.

FIG. 3 illustrates the structure of a resource grid for the duration of one uplink slot in the 3GPP LTE system.

Referring to FIG. 3, an uplink slot includes a plurality of OFDM symbols in time by NUL Resource Blocks (RBs) in frequency. An OFDM symbol represents one symbol period, also called a Single Carrier-Frequency Division Multiple Access (SC-FDMA) symbol or an OFDMA symbol or symbol period according to systems. An RB is a resource allocation unit including a plurality of subcarriers in the frequency domain. The number of RBs included in an uplink slot, NUL depends on an uplink bandwidth set for a cell. Each element of the resource grid is called a Resource Element (RE).

One RB includes 7×12 REs, that is, 7 OFDM symbols in the time domain by 12 subcarriers in the frequency domain, which is purely exemplary. Thus, the numbers of subcarriers and OFDM symbols in an RB are not limited to the above specific values. Rather, the number of OFDM symbols or the number of subcarriers in an RB may vary. The number of OFDM symbols may change according to a Cyclic Prefix (CP) length. For example, an uplink slot includes 7 OFDM symbols in case of a normal CP, whereas an uplink slot includes 6 OFDM symbols in case of an extended CP.

A resource grid may be configured for a downlink slot like the resource grid of an uplink slot in the 3GPP LTE system.

FIG. 4 illustrates a downlink subframe structure.

A downlink subframe includes two slots, each slot including 7 OFDM symbols in case of a normal CP. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. The PDSCH is a channel on which a BS transmits data to a UE.

A Physical Downlink Control Channel (PDCCH) delivers information about resource allocation (a DL grant) and a transport format for a Downlink Shared Channel (DL-SCH), resource allocation information (a UL grant) about an Uplink Shared Channel (UL-SCH), paging information of a Paging Channel (PCH), system information on the DL-SCH, resource allocation information about a higher-layer control message such as a Random Access Response transmitted on the PDSCH, a set of Transmission Power Control (TPC) commands for individual UEs of a UE group, Voice Over Internet Protocol (VoIP) activation information, etc. Control information transmitted on the above-described PDCCH is called Downlink Control Information (DCI).

Now, a detailed description will be given of downlink Reference Signals (RSs).

In the 3GPP LTE system, two types of downlink RSs are defined for unicast service, Common RS or cell-specific RS (CRS) and Dedicated RS or UE-specific RS (DRS).

CRS is an RS shared among all UEs within a cell, for use in acquisition of channel state information and handover measurement. DRS is an RS specific to a UE, for use in data demodulation. Thus it can be said that CRS is a cell-specific RS and DRS is a UE-specific RS.

A UE measures CRSs and transmits feedback information such as Channel Quality Information (CQI), a Precoding Matrix Indicator (PMI), and a Rank Indicator (RI) to a BS. Then the BS performs downlink frequency scheduling using the feedback information.

To transmit RSs to the UE, the BS allocates resources, taking into account the amount of radio resources to be allocated to the RSs, exclusive positions of CRSs and DRSs, the positions of a Synchronization Channel (SCH) and a Broadcast Channel (BCH), and the density of the DRSs.

If a relatively large amount of resources are allocated to RSs, high channel estimation performance can be achieved but data rate is relatively decreased. On the other hand, if a relatively small amount of resources are allocated to RSs, high data rate can be achieved but the result low RS density may cause degradation of channel estimation performance. Accordingly, efficient resource allocation to RSs, taking into account channel estimation and data rate is a critical factor to system performance.

Meanwhile, DRS is used only for data demodulation, whereas CRS is used for both channel information acquisition and data demodulation in the 3GPP LTE system. Especially, a CRS is transmitted in each subframe in a broadband, through each antenna port. For example, for 2Tx antennas in the BS, CRSs are transmitted respectively through antenna port 0 and antenna port 1. For 4Tx antennas in the BS, CRSs are transmitted respectively through antenna port 0 to antenna port 3.

FIG. 5 illustrates the structure of an uplink subframe in the 3GPP LTE system.

Referring to FIG. 5, an uplink subframe may be divided into a control region and a data region. A Physical Uplink Control Channel (PUCCH) including uplink control information is allocated to the control region. A Physical Uplink Shared Channel (PUSCH) including user data is allocated to the data region. In order to maintain a single carrier property, RBs allocated to a UE are contiguous in the frequency domain. That is, the UE cannot simultaneously transmit a PUCCH and a PUSCH.

A PUCCH for a UE is allocated to an RB pair in a subframe. The RBs of the RB pair occupy different subcarriers in two slots. Thus, the frequencies of the RBs of the RB pair allocated to the PUCCH are changed over a slot boundary. As the UE transmits uplink control information on different subcarriers with passage of time, a frequency diversity gain can be achieved. m is a position index indicating the frequency-domain logical position of an RB pair allocated to a PUCCH in a subframe.

Uplink control information transmitted on the PUCCH includes a Hybrid Automatic Repeat reQuest Acknowledgement/Negative Acknowledgement (HARQ ACK/NACK), a Channel Quality Indicator (CQI) indicating a downlink channel state, and a Scheduling Request (SR) requesting uplink radio resource allocation.

The PUSCH is mapped to a transport channel, Uplink Shared Channel (UL-SCH). Uplink data transmitted on the PUSCH may be a data block for a UL-SCH transmitted during a TTI, namely a transport block. The transport block may be user information. Or the uplink data may be multiplexed data. For example, control information multiplexed with data may include a CQI, a PMI, an HARQ ACK/NACK, an RI, etc. Or the uplink data may include control information only.

Meanwhile, a high data rate is required. The most basic and safe solution to the need for a high data rate is to increase a bandwidth.

However, frequency resources are saturated at present and various techniques are partially used in a broad frequency band. To secure a broad bandwidth to satisfy higher data rate requirements for this reason, the concept of designing each of scattered bands so as to meet basic requirements for operating an independent system and aggregating a plurality of bands into one system has been introduced. This concept is called Carrier Aggregation (CA). Each independent operable band is defined as a Component Carrier (CC).

CA is adopted in an LTE-Advanced (LTE-A) system as well as in the LTE system.

Carrier Aggregation

A CA system is a wireless communication system that configures a desired broad band by aggregating one or more carriers each having a narrower bandwidth than the broad band. The CA system is also called a multiple carrier system, a bandwidth aggregation system, etc. CA systems may be categorized into a contiguous CA system using contiguous carriers and a non-contiguous CA system using non-contiguous carriers. It should be understood that a multiple carrier system or a CA system covers both a contiguous CC case and a non-contiguous CC case in the following description.

A guard band may be interposed between carriers in the contiguous CA system. To ensure backward compatibility with a legacy system, each of one or more carriers that are aggregated may use a bandwidth defined in the legacy system. For example, the 3GPP LTE system supports 1.4, 3, 5, 10, 15 and 20 MHz. Alternatively, a broad band may be configured by defining a new bandwidth, instead of using the bandwidths of the legacy system.

A UE may transmit or receive one or more carriers according to its capabilities in the CA system.

FIG. 6 illustrates an example of communication on a single CC. This communication may be conducted in the LTE system.

Referring to FIG. 6, data transmission and reception are performed in a single downlink band and a single uplink band corresponding to the downlink band in a typical Frequency Division Duplex (FDD) wireless communication system. A BS and a UE transmit and receive data and/or control information that is scheduled on a subframe-by-subframe basis. The data is transmitted and received in the data region of an uplink/downlink subframe and the control information is transmitted and received in the control region of the uplink/downlink subframe. For transmission and reception of data and control information, the uplink/downlink subframe carries signals on various physical channels. While FIG. 7 is described mainly in the context of FDD, the same description is also applicable to a Time Division Duplex (TDD) system in which a radio frame is divided into uplink and downlink in time.

FIG. 7 illustrates an example of communication on multiple CCs. The communication may be performed in the LTE-A system. The LTE-A system uses CA or bandwidth aggregation by collecting a plurality of uplink/downlink frequency blocks to use a broader frequency band. Each frequency block is transmitted on a CC. In the specification, a CC may refer to a frequency block for CA or the center subcarrier of the frequency block. These two meanings are interchangeably used.

Referring to FIG. 7, a bandwidth of 100 MHz may be supported by aggregating 5 20-MHz CCs on uplink/downlink. The CCs may be contiguous or non-contiguous in the frequency domain. For example, the bandwidths of uplink CCs may be configured into 5 MHz (UL CC0)+20 MHz (UL CC1)+20 MHz (UL CC2)+20 MHz (UL CC3)+5 MHz (UL CC4). In addition, asymmetrical CA is also possible by configuring different numbers of uplink CCs and downlink CCs. Asymmetrical CA may take place due to a limited available frequency band or may be artificially implemented according to a network setting. For example, despite the existence of N CCs in a total system band, a frequency band that a specific UE can receive may be limited to M(<N) CCs. Various CA parameters may be configured cell-specifically, UE group-specifically, or UE-specifically.

While an uplink signal and a downlink signal are transmitted on one-to-one mapped CCs in the illustrated case of FIG. 7 by way of example, the number of actual CCs carrying signals may vary depending on a network setting or the type of the signals.

For instance, when a scheduling command is transmitted in DL CC1 on downlink, data corresponding to the scheduling command may be transmitted on another DL CC or UL CC. In addition, control information related to a DL CC may be transmitted in a specific UL CC on uplink irrespective of DL-UL CC mapping. DCI may be transmitted in a specific DL CC in a similar manner.

FIG. 8 is a block diagram referred to for describing a 3GPP LTE uplink access scheme, SC-FDMA.

For LTE uplink, SC-FDMA is adopted, which is similar to OFDM but reduces the power consumption and power amplifier cost of a portable terminal by Peak to Average Power Ratio (PAPR) reduction.

SC-FDMA is very similar to OFDM in that a signal is transmitted on subcarriers by Fast Fourier Transform (FFT) and Inverse Fast Fourier Transform (IFFT). SC-FDMA is also similar to OFDM in that a simple equalizer can be used in the frequency domain by using a guard interval (CP) against Inter-Symbol Interference (ISI) caused by multi-path fading. Compared to OFDM, SC-FDMA improves the power efficiency of a transmitter by reducing the PAPR of the transmitter by about 2 to 3 dB through additional unique techniques.

A problem encountered with a conventional OFDM transmitter is that signals on subcarriers along the frequency axis are converted to a time signal by IFFT. Since IFFT is a process of parallel executions of the same operation, it increases PAPR.

Referring to FIG. 8, in SC-FDMA, information is first subjected to Discrete Fourier Transform (DFT) in a DFT processor to solve the above problem. A subcarrier mapper 13 maps the DFT-spread signal (or the DFT-precoded signal in the same meaning) to subcarriers and an IFFT processor 14 converts the mapped signals to a time signal.

SC-FDMA outperforms OFDM in terms of transmission power efficiency because the PAPR of a time signal after IFFT is not increased much due to the correlation among DFT, subcarrier mapping, and IFFT.

That is, the transmission scheme of performing IFFT after DFT spreading is called SC-FDMA.

SC-FDMA is advantageous in that it is robust against multi-path fading channels due to a similar structure to OFDM and the problem of a PAPR increase encountered with IFFT in OFDM is radically solved. As a consequence, power amplifiers can be used efficiently. SC-FDMA is also called DFT spread OFDM (DFT-s-OFDM).

That is, SC-FDMA can reduce PAPR or Cubic Metric (CM). Furthermore, the non-linear distortion range of a power amplifier can be avoided by using SC-FDMA as a transmission scheme, thereby increasing the transmission power efficiency of a UE having limited power consumption. Accordingly, user throughput can be increased.

The 3GPP is actively working on standardization of LTE-A evolved from LTE. Although SC-FDMA-based techniques competed with OFDM-based techniques as in the standardization process of LTE, clustered-DFT-s-OFDM has been adopted, which allows non-contiguous resource allocation.

The LTE-A system will be described below in detail.

FIG. 9 is a block diagram referred to for describing clustered DFT-s-OFDM adopted as an uplink access scheme in the LTE-A standard.

The main feature of clustered DFT-s-OFDM lies in that it can flexibly cope with a frequency selective fading environment by enabling frequency selective resource allocation.

Compared to the conventional LTE uplink access scheme, SC-FMDA, clustered DFT-s-OFDM adopted as an LTE-A uplink access scheme allows non-contiguous resource allocation. Therefore, uplink transmission data may be partitioned into a plurality of clusters.

That is, while the LTE system maintains the single carrier property for uplink, the LTE-A system allows non-contiguous allocation of DFT-precoded data along the frequency axis or simultaneous transmission of a PUSCH or PUCCH.

DISCLOSURE

Technical Problem

An object of the present invention devised to solve the conventional problem is to provide a method for efficiently measuring a cell at a User Equipment (UE).

Technical Solution

In an aspect of the present invention, a cell measurement method of a UE includes receiving a radio resource configuration dedicated Information Element (IE) and a measurement object from a serving cell. The radio resource configuration dedicated IE may include first information about a measurement resource restriction pattern for a first cell and the measurement object may include a neighbor cell configuration IE for indicating MBMS Single Frequency Network (MBSFN) configurations of one or more neighbor cells. The measurement object may further include second information about a resource restriction pattern indicating subframes on which restriction is imposed in Reference Signal Received Power (RSRP) and Reference Signal Received Quality (RSRQ) measurements of one or more neighbor cells and a list of one or more neighbor cells to which the second information is applied. If the MBSFN configurations of the one or more neighbor cells are not known or not explicitly indicated by the neighbor cell configuration IE, the method may further include determining that the subframes indicated by the second information have not been configured as MBSFN subframes for the one or more neighbor cells listed in the list.

In another aspect of the present invention, a UE includes a receiver for receiving a radio resource configuration dedicated IE and a measurement object from a serving cell. The radio resource configuration dedicated IE may include first information about a measurement resource restriction pattern for a first cell and the measurement object may include a neighbor cell configuration IE for indicating MBSFN configurations of one or more neighbor cells. The measurement object may further include second information about a resource restriction pattern indicating subframes on which restriction is imposed in RSRP and RSRQ measurements of one or more neighbor cells and a list of one or more neighbor cells to which the second information is applied. The UE further includes a controller for, if the MBSFN configurations of the one or more neighbor cells are not known or not explicitly indicated by the neighbor cell configuration IE, determining that the subframes indicated by the second information have not been configured as MBSFN subframes for the one or more neighbor cells listed in the list.

The first information may be measSubframePattern-Serv, the second information may be measSubframePattern-Neigh, the list may be measSubframeCellList, or the neighbor cell configuration IE may be neighCellConfig.

If the controller determines a subframe not to have been configured as an MBSFN subframe, the receiver may receive a plurality of Common Reference Signals (CRSs) in the subframe and the controller may measure one or more of RSRP and RSRQ using the received CRSs.

The second information about the resource restriction pattern may be set to indicate only normal subframes, not MBSFN subframes.

The normal subframes may be subframes 0, 4, 5, and 9 in Frequency Division Duplex (FDD) and subframes 0, 5 and 6 in Time Division Duplex (TDD).

The measurement object may be included in Measurement Config.

The radio resource configuration dedicated IE and the measurement object may be received in a Radio Resource Control (RRC) connection reconfiguration message.

Advantageous Effects of the Invention

According to the present invention, Reference Signal Received Power (RSRP) or Reference Signal Received Quality (RSRQ) can be measured with higher accuracy in a shorter time.

BEST MODE FOR CARRYING OUT THE INVENTION

Figure 1:
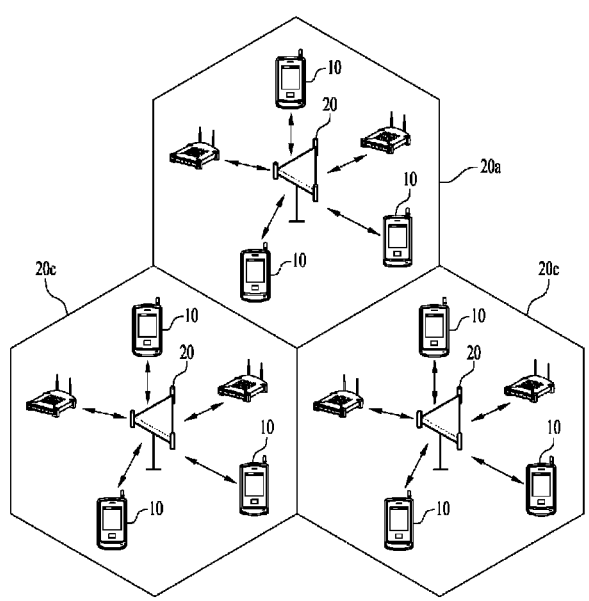
FIG. 1 illustrates a wireless communication system.
Figure 2:
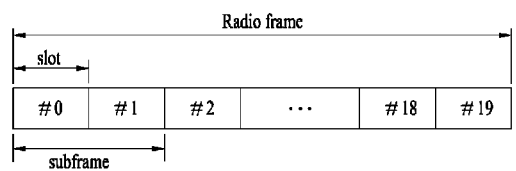
FIG. 2 illustrates the structure of a radio frame in a $3^{rd}$ Generation Partnership Project Long Term Evolution (3GPP LTE) system.
Figure 3:
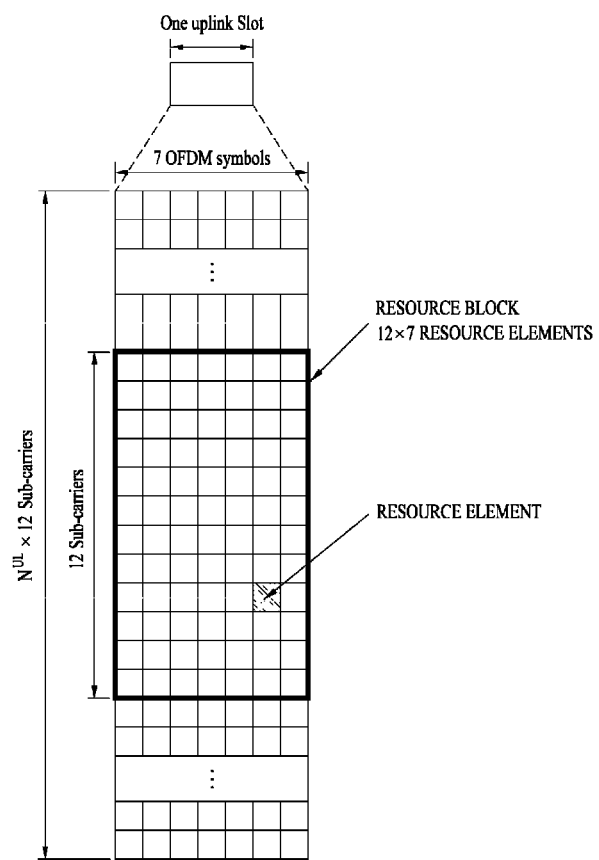
FIG. 3 is an exemplary diagram illustrating a resource grid for the duration of one uplink slot in the 3GPP LTE system.
Figure 4:
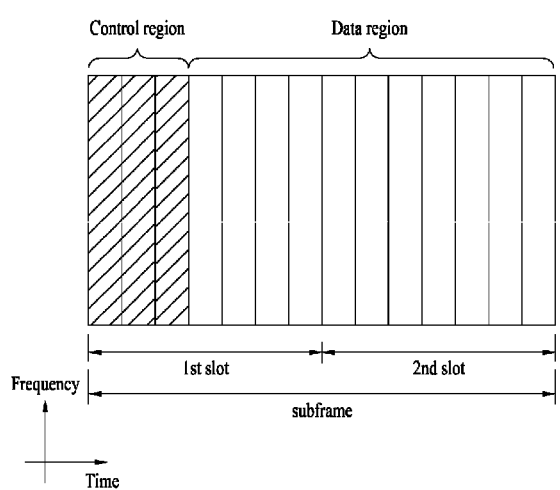
FIG. 4 illustrates the structure of a downlink subframe.
Figure 5:
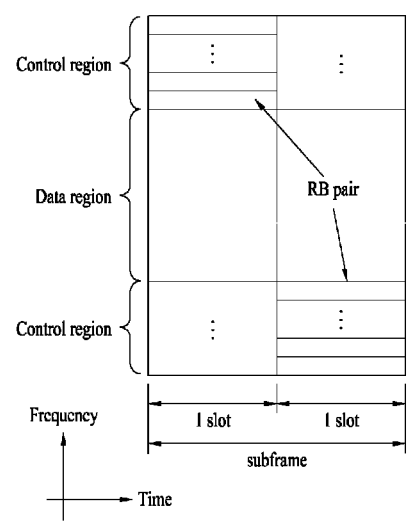
FIG. 5 illustrates the structure of an uplink subframe in the 3GPP LTE system.
Figure 6:
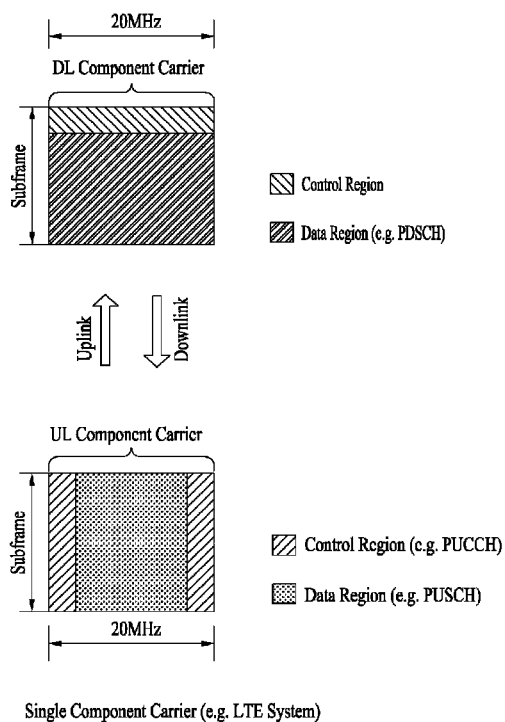
FIG. 6 illustrates an example of conducting communication in a single Component Carrier (CC) situation in the 3GPP LTE system.
Figure 7:
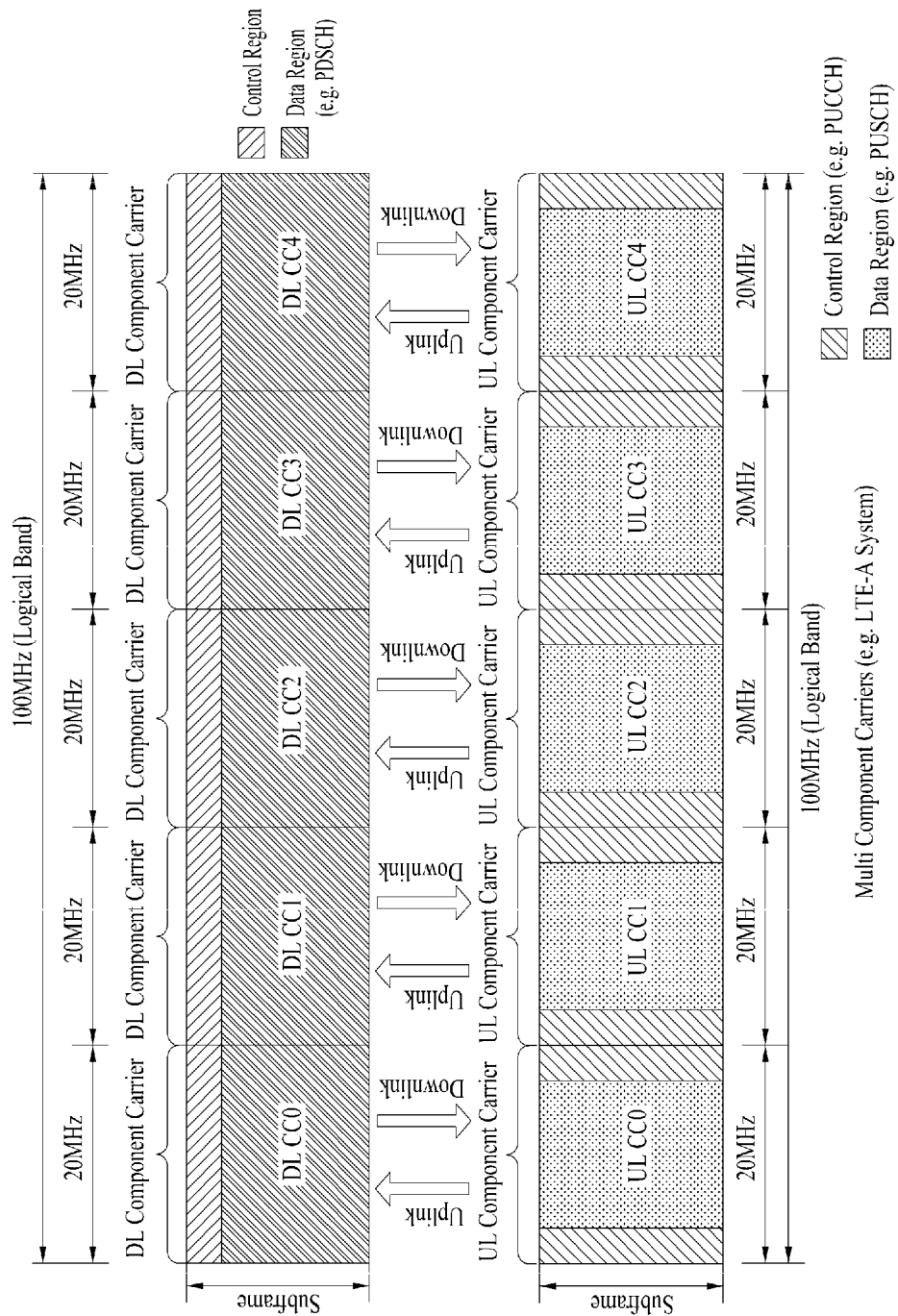
FIG. 7 illustrates an example of conducting communication in a multiple CC situation.
Figure 8:
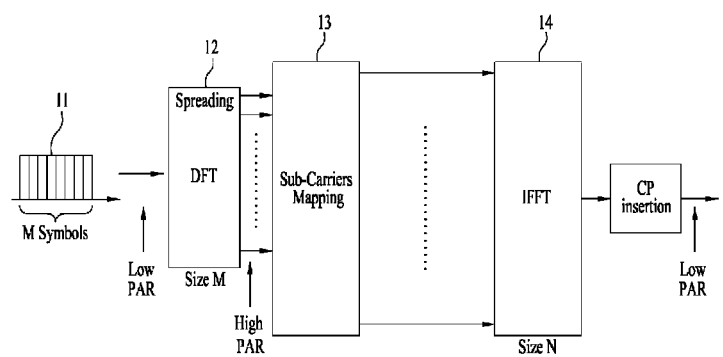
FIG. 8 is a block diagram referred to for describing a 3GPP LTE uplink access scheme, Single Carrier-Frequency Division Multiple Access (SC-FDMA)
Figure 9:
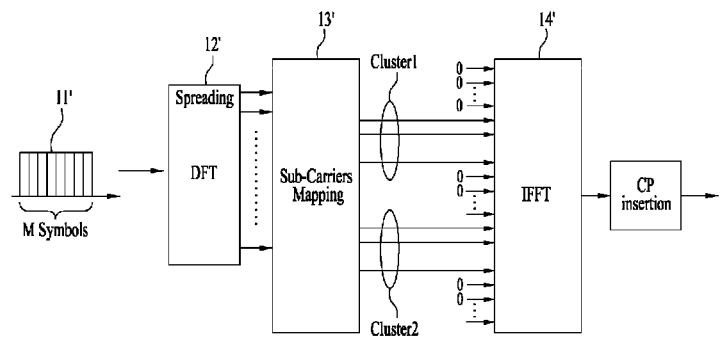
FIG. 9 is a block diagram referred to for describing a LTE-Advanced (LTE-A) uplink access scheme, clustered Discrete Fourier Transform-spread-Orthogonal Frequency Division Multiplexing (clustered DFT-s-OFDM)

The embodiments of the present invention can be used for various radio access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as UTRA (Universal Terrestrial Radio Access) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA, and LTE-Advanced (LTE-A) is an evolved version of 3GPP LTE.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning or as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

Herein, a singular expression covers a plural expression unless otherwise specified in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

Preferred embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereafter, the term User Equipment (UE) is used, but the UE may be called by other names such as terminal, Mobile Equipment (ME), Mobile Station (MS), User Terminal (UT), SS (Subscriber Station), wireless device, handheld device, or Access Terminal (AT). Also, the UE may be a portable device having a communication function such as a mobile phone, a Personal Digital Assistant (PDA), a smart phone, a wireless MODEM, a laptop computer, and the like, or may be a device which is not portable and has a communication function such as a PC or a vehicle-mounted device.

Figure 10:
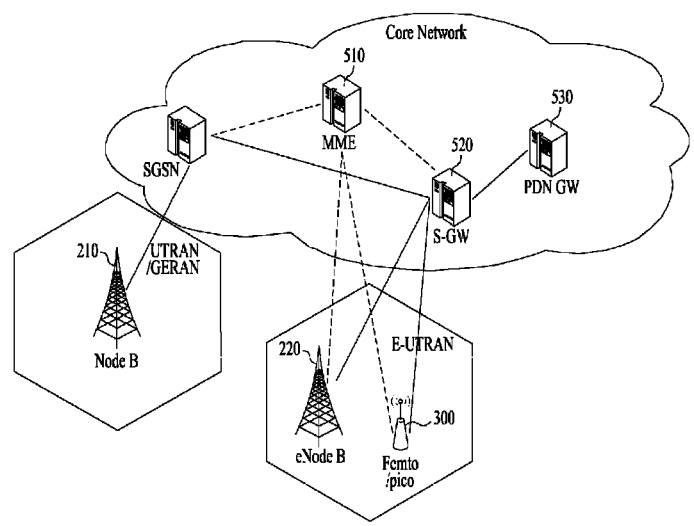
FIG. 10 illustrates the configuration of an evolved mobile communication network.

FIG. 10 illustrates the configuration of an evolved mobile communication network.

One of distinctive features of the network configuration illustrated in FIG. 10 lies in that it is based on the 2 tier model of an eNode B 220 of an evolved UMTS Terrestrial Radio Access Network (E-UTRAN) and a core network. It may be considered that the eNode B 200 has the Radio Network Controller (RNC) function of a Node B 210 of a conventional UMTS system and a gateway has the Serving GPRS Support Node/Gateway GPRS Support Node (SGSN/GGSN) function of a conventional system, although not perfectly matching.

Another distinctive feature is that the control plane and the user plane are exchanged via different interfaces between the access network and the core network. Compared to the conventional UMTS system in which an Iu interface exists between the RNC and the SGSN, two separate interfaces, i.e., S1-MME and S1-U, are used since a Mobility Management Entity (MME) 510 which handles the processing of a control signal is structured to be separated from the Gateway (GW). There are two types of GWs: a Serving Gateway (SG) 520 and a Packet Data Network GW (PDN-GW or P-GW) 530.

Meanwhile, the $3^{rd}$ Generation (3G) or $4^{th}$ Generation (4G) mobile communication system continues efforts to increase cell capacity for the purpose of supporting high-capacity service such as multimedia content, streaming, etc. and interactive service.

As various large-capacity transmission techniques have been demanded along with the development of communication and multimedia technology, radio capacity can be increased by allocating more frequency resources. However, there is a limit in allocating more frequency resources to multiple users because the frequency resources are limited.

An approach to using a high frequency band and reducing a cell radius has been taken to increase cell capacity. Use of picocells or femtocells with smaller cell radiuses enables use of a higher frequency band and thus transmission of more information, compared to a conventional cellular system. Despite the advantage, the picocells or femtocells increase cost because more BSs should be installed in the same area.

As an approach to increasing cell capacity by means of such small-size cells, femtocells/picocells have recently been proposed. A picocell is a small cell with a smaller radius than a macrocell and a femtocell is a cell managed by a Home eNode B (HeNB). Since a service provider installs picocells and users install femtocells, it is assumed in the 3GPP system that the service provider is not accurately aware of the existence of the femtocells.

A femtocell/picocell 300 was initially developed in the name of a HeNB in RAN WG3. The eNode B 220 or the Node B 210 is called a macrocell in a relative sense. Hereinbelow, the Node B 210 and the eNode B 220 are referred to as macrocells 200.

The specification is described in the context of 3GPP and the term (e)Node B is used to address both a Node B and an eNode B.

Interfaces marked with dotted lines serve to transmit control signals between an MME 510 and the eNode B 220 and between the MME 510 and the femtocell/picocell 300. Interfaces marked with solid lines serve to transmit user-plane data between the MME 510 and the eNode B 220 and between the MME 510 and the femtocell/picocell 300.

Figure 11:
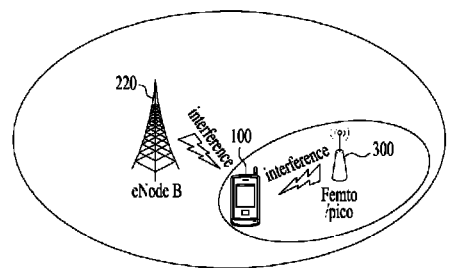
FIG. 11 illustrates a case where a picocell/femtocell coexists with a macrocell within the coverage of the macrocell.

FIG. 11 illustrates a case where a picocell/femtocell is coexistent with a macrocell within the coverage of the macrocell.

As illustrated in FIG. 11, a heterogeneous network such as a picocell/femtocell exists within the coverage of a macrocell, interference between the picocell/femtocell and a macrocell becomes a problem.

For example, when the UE 100 is connected to the picocell 300 and moves to the boundary of the picocell 300, the UE 100 may be disconnected from the picocell 300 due to interference from the macrocell 200. This implies that the coverage of the picocell 300 gets smaller than a service provider has intended.

In another example, when the UE 100 is connected to the macrocell 200 and moves to the service area of the femtocell 300, the UE 100 may be disconnected from the macrocell 200 due to interference from the femtocell 300. This implies that a shadowing area has been produced in the macrocell 200.

The first example is referred to as a macro-pico problem and the second example is referred to as a macro-femto problem. These two problems have emerged as challenging issues to be tacked with.

The most fundamental method to eliminate interference is to use different frequencies in heterogeneous networks. However, the frequency division is not favorable on the part of a service provider because frequency is rare, expensive resources.

In this context, the 3GPP has made efforts to eliminate inter-cell interference by time division. Time division introduced to LTE Rlease-10 is called enhanced Inter-cell Interference Coordination (ICIC) in the sense that it is enhanced relative to conventional frequency division. In enhanced ICIC, an interfering cell is called an aggressor cell or primary cell and an interfered cell is called a victim cell or secondary cell. The aggressor cell or primary cell discontinues data transmission in a specific subframe, while a UE maintains a connection to the victim cell or secondary cell in the specific subframe. In the macro-pico problem or macro-femto problem, a macrocell may be an aggressor cell or primary cell and a picocell may be the victim cell or secondary cell, or vice versa.

A specific subframe in which data transmission is discontinued is called an Almost Blank Subframe (ABS) and a subframe configured as an ABS carries no data except mandatory control information. The mandatory control information is, for example, Common Reference Signal (CRS).

In a future-generation mobile communication system, Multimedia Broadcast/Multicast Service (MBMS) has been proposed for broadcasting service.

Figure 12:
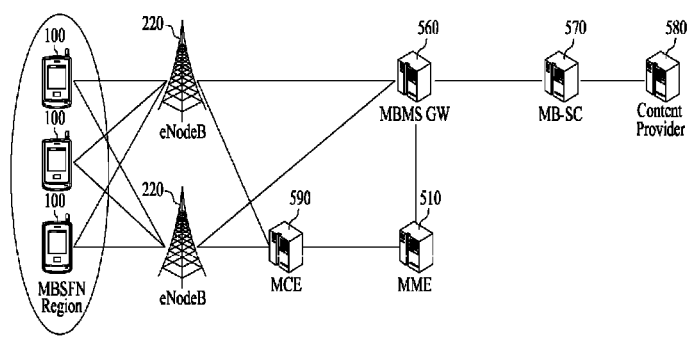
FIG. 12 illustrates a Multimedia Broadcast/Multicast Service (MBMS) system.

FIG. 12 illustrates a system that implements MBMS.

Referring to FIG. 12, the MBMS system includes an MBMS GW 560, a Multicast Broadcast Service Center (MBSC) 570, a content provider 580, and a MBMS Coordination Entity (MCE) 590 in addition to the eNode B 220 and the MME 510 illustrated in FIG. 10.

In MBMS Single Frequency Network (MBSFN), a plurality of eNode Bs 220 are regulated to transmit the same data in the same form at the same time point within one service area.

MBMS is a service of providing a streaming or background broadcast or multicast service to a plurality of UEs by a downlink dedicated MBMS bearer service. MBMS services can be categorized into multi-cell service and single cell service. As their appellations imply, the multi-cell service refers to providing the same service to a plurality of cells and the single cell service refers to providing the same service only to a single cell.

In the multi-cell service, a UE may receive data of the same multi-cell service from a plurality of cells in an MBSFN manner and combine the received data.

A subframe carrying MBMS data is signaled as an MBSFN subframe to the UE so that the UE may identify the subframe.

Figure 13:
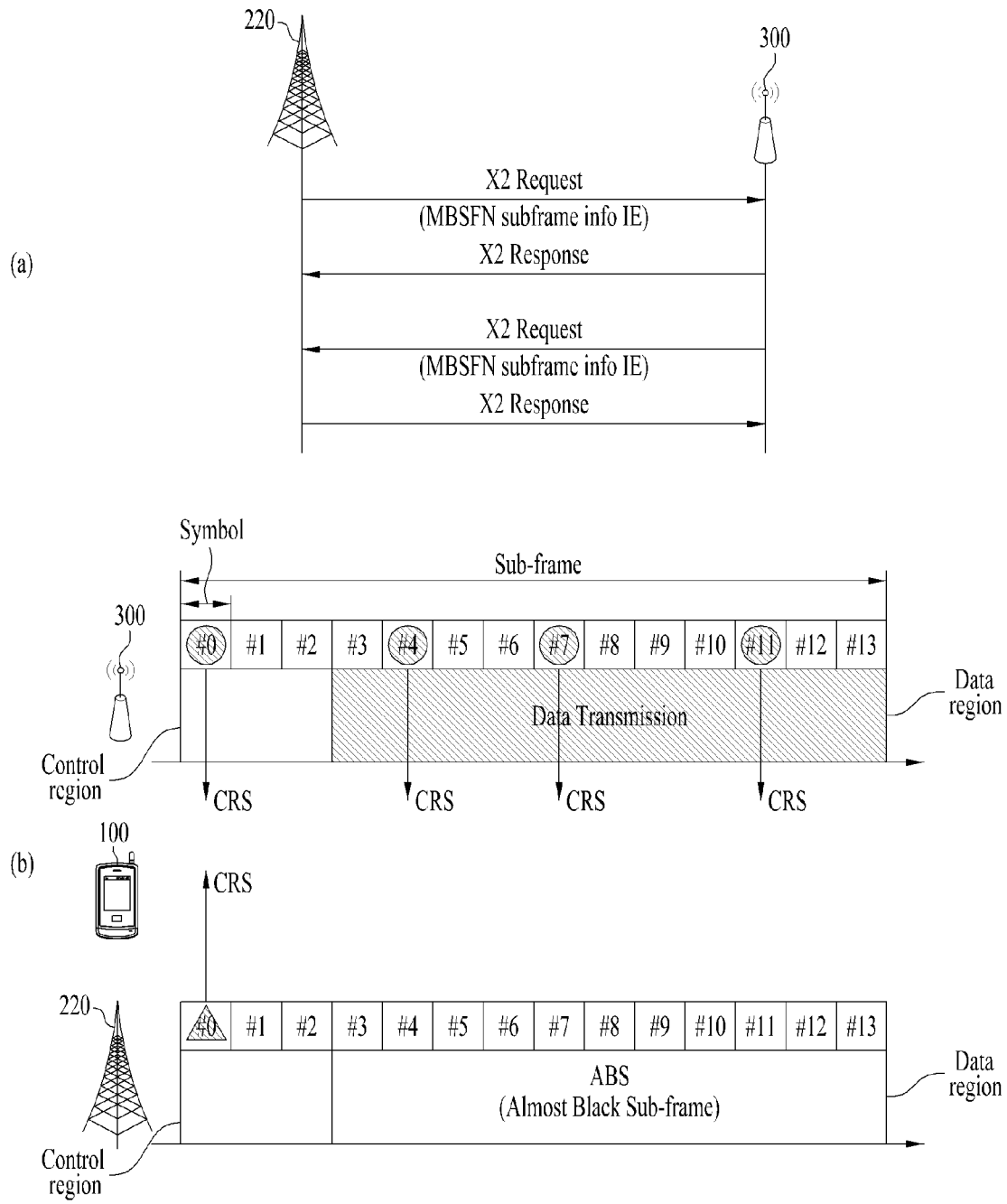
FIG. 13 illustrates an example of enhanced Inter-Cell Interference Coordination (eICIC) designed to solve inter-Base Station (BS) interference.

FIG. 13 illustrates an example of eICIC to cancel inter-cell interference.

Referring to FIG. 13(a), the macrocell, i.e. the eNode B 220 and the picocell 300 exchange MBSFN subframe information via an X2 interface.

For example, the macrocell, i.e. the eNode B 220 includes information about an MBSFN subframe and information about a subframe designated as an ABS in an MBSFN subframe Info Information Element (IE) and transmits the MBSFN subframe Info IE in an X2 Request message to the picocell 300.

Likewise, the picocell 300 includes information about an MBSFN subframe and information about a subframe designated as an ABS in an MBSFN subframe Info IE and transmits the MBSFN subframe Info IE in an X2 Request message to the eNode B 220.

In this manner, the macrocell, i.e. the eNode B 220 and the picocell 300 may exchange MBSFN subframe information with each other via the X2 interface.

However, an X2 interface is not available between the macrocell, i.e. the eNode B 220 and the femtocell 300. To acquire information about an MBSFN subframe from the macrocell, i.e. the eNode B 220, the femtocell 300 may acquire system information broadcast wirelessly from the macrocell, i.e. the eNode B 220 or from a controller of a core network.

FIG. 13(b) illustrates a subframe configured as an MBSFN subframe by the picocell 300. When the picocell 300 configures the subframe as an MBSFN subframe and indicates the MBSFN subframe to the macrocell, i.e. the eNode B 220 via the X2 interface, the macrocell 220 uses the subframe as an ABS.

The picocell 300 transmits data in the data region of the subframe with CRSs in symbols 0, 4, 7, and 11.

In the meantime, if the macrocell, i.e. the eNode B 220 operates in eICIC, it transmits no data in the data region of the subframe, thus preventing interference. Notably, the macrocell, i.e. the eNode B 220 transmits only CRSs in the subframe.

The UE measures Reference Signal Received Power (RSRP) or Reference Signal Received Quality (RSRQ) using the CRSs received from the macrocell, i.e. the eNode B 220 and the picocell 300. If the serving cell of the UE 100 is the macrocell 220 and its neighbor cell is the picocell 300, the UE 100 measures the RSRP and RSRQ of the serving cell using the CRSs received from the macrocell 220, while the UE 100 measures the RSRP and RSRQ of the neighbor cell using the CRSs received from the picocell 300.

FIGS. 14a to 14d illustrate exemplary subframes configured as ABSs.

Figure 14A:
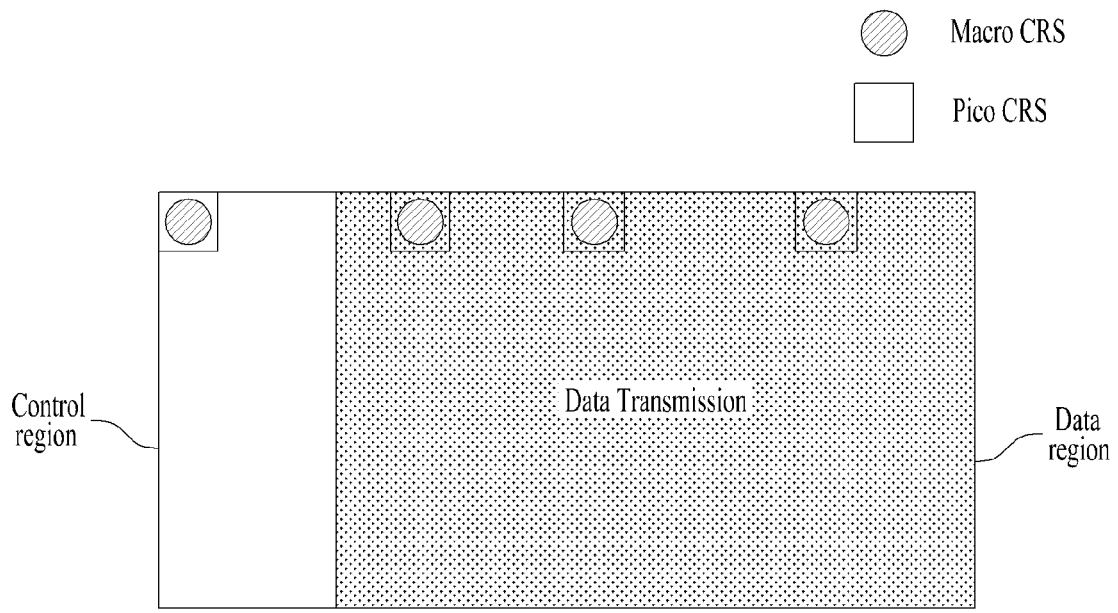
FIGS. 14*a* to 14*d* illustrate exemplary subframes serving as Almost Blank Subframes (ABSs)

FIG. 14a illustrates a relationship between a macrocell and a picocell in a non-MBSFN subframe, i.e. a normal subframe. The macrocell transmits data in the data region of the subframe with CRSs in symbols 0, 4, 7 and 11. If the macrocell and the picocell transmit CRSs in the same symbols, the CRSs collide, thus causing interference.

Figure 14B:
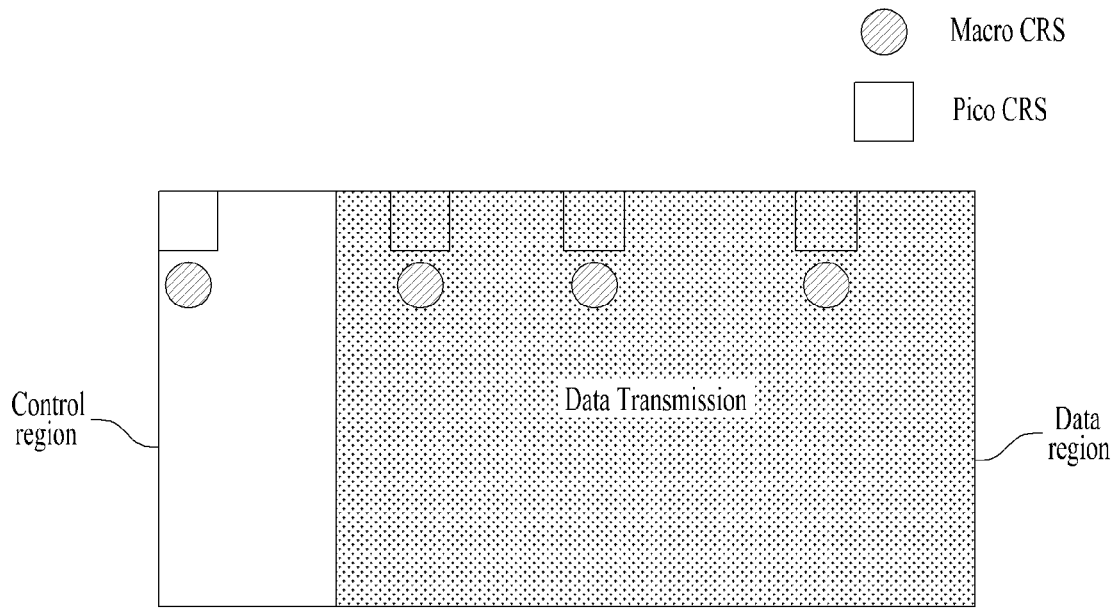

FIG. 14b illustrates another relationship between a macrocell and a picocell in a non-MBSFN subframe, that is, a normal subframe. The macrocell transmits data in the data region of the subframe with CRSs in symbols 0, 4, 7 and 11. If the macrocell and the picocell transmit CRSs in different resources of symbols 0, 4, 7 and 11, collision may be avoided.

Figure 14C:
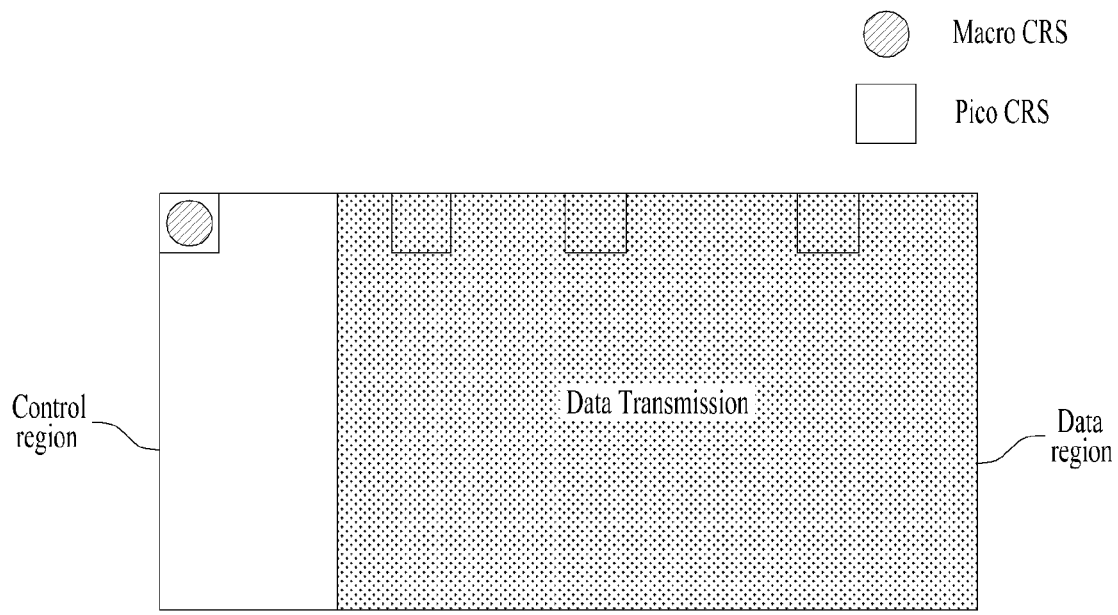

FIG. 14c illustrates a relationship between a macrocell and a picocell in an MBFSN subframe of the picocell. The picocell 300 transmits data in the data region of the MBSFN subframe with CRSs in symbols 0, 4, 7, and 11. On the other hand, if the macrocell 220 operates in eICIC, it does not transmit data in the data region of the subframe, except for a CRS in symbol 0. As a consequence, the CRSs in symbol 0 collide with each other, causing interference.

Figure 14D:
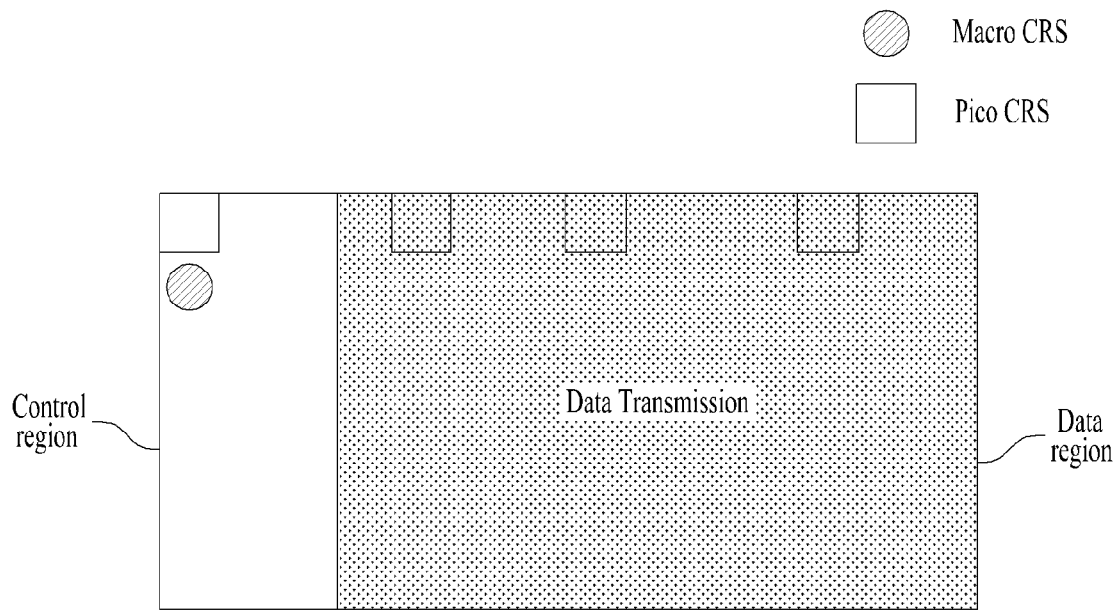

FIG. 14d illustrates another relationship between a macrocell and a femtocell/picocell in an MBSFN subframe of the picocell 300. The picocell 300 transmits data in the data region of the MBSFN subframe with CRSs in symbols 0, 4, 7 and 11. On the other hand, if the macrocell 220 operates in eICIC, it does not transmit data in the data region of the subframe, except for a CRS in symbol 0. If the macrocell 220 transmits the CRS in different resources from those used for the picocell 300 in symbol 0, collision may be avoided.

Figure 15:
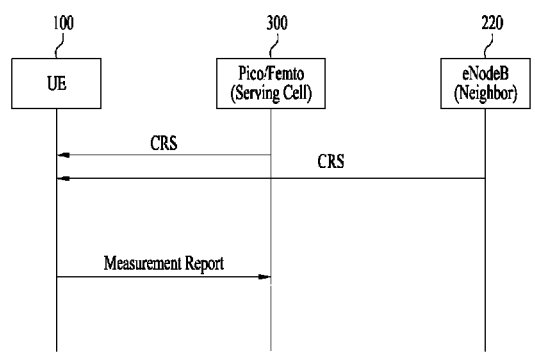
FIG. 15 is a diagram illustrating a signal flow for measuring Reference Signal Received Power (RSRP) or Reference Signal Received Quality (RSRQ) measurement using Common Reference Signals (CRSs)

FIG. 15 is a diagram illustrating a signal flow for measuring RSRP and RSRQ using CRSs.

Referring to FIG. 15, if the picocell/femtocell 300 is a serving cell for the UE 100 and the macrocell, i.e. the eNode B 220 is a neighbor cell for the UE 100, upon receipt of CRSs from the serving cell and the neighbor cell, the UE measures RSRP and RSRQ using the received CRSs and transmits the measurements to the picocell/femtocell 300 as the serving cell.

Now a description will be given of transmission of information needed for measurement at a UE from a serving cell to the UE.

Figure 16:
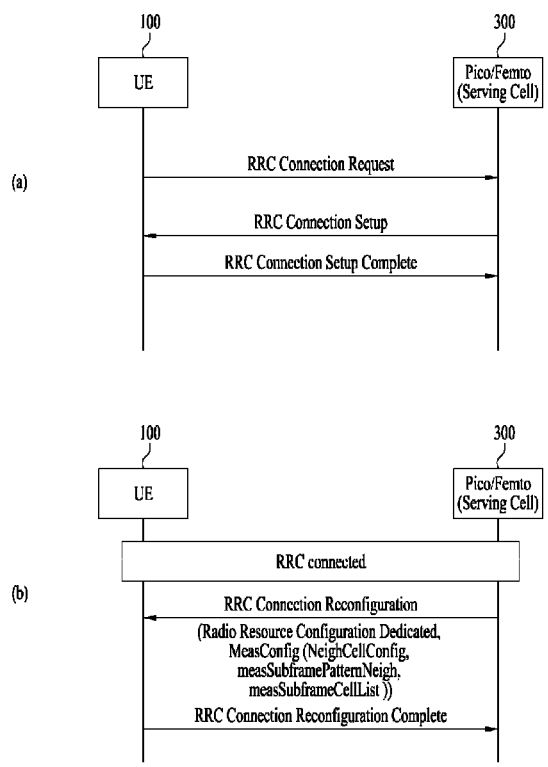
FIG. 16 illustrates operations for transmitting information required for measurement to a User Equipment (UE)
Figure 17:
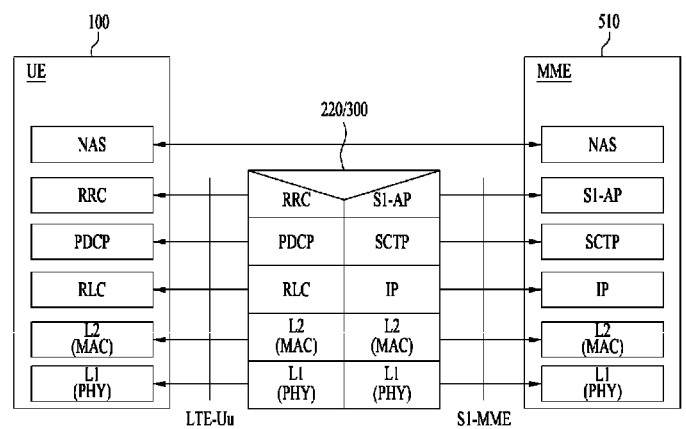
FIG. 17 illustrates a control-plane protocol stack and a user-plane protocol stack in a radio interface protocol architecture conforming to a 3GPP radio access network standard between a UE and an Evolved-UMTS Terrestrial Radio Access Network (E-UTRAN)
Figure 18:
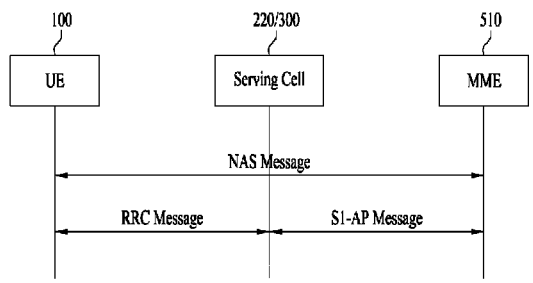
FIG. 18 is a diagram illustrating a message flow based on the protocol architecture illustrated in FIG. 17.

FIG. 16 illustrates an operation for transmitting information needed for measurement to a UE and FIG. 17 illustrates a control-plane protocol stack and a user-plane protocol stack in a radio interface protocol architecture conforming to a 3GPP radio access network standard between a UE and an E-UTRAN. FIG. 18 is a diagram illustrating a message flow based on the protocol architecture illustrated in FIG. 17.

Referring to FIG. 16(a), the UE 100 performs an RRC connection establishment procedure with its serving cell, the picocell/femtocell 300.

Before describing Radio Resource Control (RRC), the protocol architecture for the UE 100, the serving cell 200 or 300, and the MME 510 will first be described below with reference to FIG. 17.

Protocols among the UE 100, the serving cell 200 or 300, and the MME 510 may be categorized into control plane and user plane. The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, Medium Access Control (MAC). The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in OFDMA for downlink and in SC-FDMA for uplink.

The MAC layer at Layer 2 (L2) provides service to its higher layer, Radio Link Control via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

An RRC layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the UE and the E-UTRAN. For this purpose, the RRC layers of the UE and the E-UTRAN exchange RRC messages with each other. If an RRC connection is established between a UE and the E-UTRAN, the UE is in RRC Connected mode and otherwise, the UE is in RRC Idle mode. A Non-Access Stratum (NAS) layer above the RRC layer performs functions including session management and mobility management.

As noted from FIG. 18, messages transmitted between the UE 100 and the serving cell, for instance, the eNode B 220 or the picocell/femtocell 300 are based on the RRC protocol. Messages transmitted between the serving cell 220 or 300 and the MME 510 are based on the S1 Application Protocol (S1-AP).

Messages transmitted between the UE 100 and the MME 510 are based on the NAS protocol. The NAS messages are encapsulated in RRC messages and S1-AP messages, prior to transmission.

RRC states and RRC connection will be described below.

The RRC states are defined depending on whether the RRC layer of a UE is logically connected to the RRC layer of the E-UTRAN. If an RRC connection has been established between the RRC layers of the UE and the E-UTRAN, the UE is in RRC_CONNECTED state. Otherwise, the UE is in RRC_IDLE state. The E-UTRAN may effectively control UEs because it can determine the presence of RRC_CONNECTED UEs on a cell basis. However, the E-UTRAN cannot find out RRC_IDLE UEs on a cell basis and thus a CN manages RRC_IDLE UEs on a Tracking Area (TA) basis. A TA is an area unit larger than a cell. That is, only the existence or absence of an RRC_IDLE UE is determined on a large area basis and if an RRC_IDLE UE wants to receive a service like voice or data service from a cell, it should transition to the RRC_CONNECTED state.

When a user initially powers on a UE, the UE first searches for a suitable cell and then stays in the RRC_IDLE state. Only when the RRC_IDLE UE needs to establish an RRC connection, the RRL_IDLE UE transitions to the RRC_CONNECTED state by performing an RRC connection establishment procedure. In the case where the UE needs to transmit an uplink signal for a reason such as a call attempt from a user, or a response message to a paging message received from the E-UTRAN, the UE is to establish an RRC connection.

To transition to the RRC_CONNECTED state, the UE 100 performs an RRC connection establishment procedure. Referring to FIG. 16(a), the UE transmits an RRC Connection Request message to the serving cell, that is, the picocell/femtocell 300.

Upon receipt of an RRC Connection Setup message in response to the RRC Connection Request message from the serving cell, the UE 100 transmits an RRC Connection Setup Complete message to the serving cell.

Referring to FIG. 16(b), if it is necessary to reconfigure the RRC connection with the UE 100 after transitioning to the RRC_CONNECTED state, the serving cell, that is, the piceocell/femtocell 300 transmits an RRC Connection Reconfiguration message to the UE 100.

The RRC Connection Reconfiguration message may include, for example, a Radio Resource Configuration Dedicated IE and Measurement Config, as illustrated in FIG. 16(b). [Table 1] illustrates information included in the RRC Connection Reconfiguration message.

TABLE 1 measConfig mobilityControlInfodedicatedInfoNASList
radioResourceConfigDedicatedsecurityConfigHOnonCriticalExtension As described above, the RRC Connection Reconfiguration message includes the Radio Resource Configuration Dedicated IE, Measurement Config, etc.

The Radio Resource Configuration Dedicated IE is used to set up/modify/release Radio Bearers or to modify a MAC configuration. The Radio Resource Configuration Dedicated IE includes subframe pattern information. The subframe pattern information indicates a time-domain resource restriction pattern used for measuring the RSRP and RSRQ of a Primary Cell (PCell).

The Radio Resource Configuration Dedicated IE includes the following fields.

TABLE 2

- RadioResourceConfigDedicated- measSubframePatternPCell-r10

The RadioResourceConfigDedicated field includes the following factors.

TABLE 3

RadioResourceConfig field descriptions
logicalChannelConfig
For SRBs, a choice is used to indicate whether the logical channel configuration is signaled explicitly or set to the default logical channel configuration for SRB1.
logicalChannelIdentify
a logical channel identity for both UL and DL
mac-MainConfig
a choice used to indicate whether the mac-MainConfig is signaled explicitly or set to a default MAC main configuration.
measSubframePatternPcell
a time-domain measurement resource restriction pattern for PCell (or serving cell) measurements (RSRP and RSRQ).
physicalConfigDedicated
a default dedicated physical configuration As described before, the RRC Connection Reconfiguration message includes measSubframePatternPCell or measSubframePattern-Serv that specifies a time-domain measurement resource restriction pattern for PCell (or serving cell) measurements (RSRP and RSRQ) in the RadioResourceConfigDedicated field.

Meanwhile, Measurement Config includes the following IE.

TABLE 4

MeasConfig ::= -- Measurement objects measObjectToRemoveList measObjectToAddModList The Measurement objects IE includes measObjectToRemoveList indicating a list of measurement objects to be removed and measObjectToAddModList indicating a list of measurement objects to be added or modified.

measObject includes MeasObjectCDMA2000, MeasObjectEUTRA, MeasObjectGERAN, etc. according to communication technologies.

The MeasObjectEUTRA IE specifies information applicable to intra-frequency or inter-frequency in respect of measuring E-UTRA cells. The MeasObjectEUTRA IE is tabulated as follows.

TABLE 5

1) MeasObjectEUTRA- neighCellConfig-
measSubframePatternConfigNeigh-r102)

TABLE 5-continued

MeasSubframePatternConfigNeigh-r10 measSubframePatternNeigh-r10
measSubframeCellList-r10

The MeasObjectEUTRA IE is specified ads follows.

TABLE 6

MeasObjectEUTRA field descriptions
carrierFreq
identifies an E-UTRA carrier frequency for this configuration is valid
neighCellConfig
provides information about the configurations of neighbor cells
measCycleSCell
Parameter: $T_{measure\_sec}$. This parameter is used when a SCell is configured in a frequency indicated by measObject and is in deactivated state.
measSubframeCellListmeas
a list of cells to which SubframePatternNeigh is applied. If not included, the UE applies a time-domain measurement resource restriction pattern to all neighbor cells.
measSubframePatternNeigh
a time-domain measurement resource restriction pattern applicable to neighbor cell RSRP and RSRQ measurements in the carrier frequency indicated by carrierFreq As described above, the MeasObjectEUTRA IE includes information about the configurations of neighbor cells (i.e. NeighCellConfig), a time-domain measurement resource restriction pattern applicable to neighbor cell RSRP and RSRQ measurements (i.e. measSubframePatternNeigh), and a list of cells to which the pattern is applied (i.e. measSubframeCellList).

The information about the configurations of neighbor cells (i.e. NeighCellConfig) includes information related to the MBSFN and TDD UL/DL configurations of the neighbor cells.

TABLE 7

NeighCellConfig field descriptions
neighCellConfig
Provides information related to MBSFN and TDD UL/DL configurations of neighbor cells.
00: Not all neighbor cells have the same MBSFN subframe allocation as the serving cell in a specific frequency.
10: The MBSFN subframe allocations of all neighbor cells are identical to that of the serving cell in the specific frequency.
01: No MBSFN subframes are preset in any of neighbor cells.
11: Neighbor cells have different UL/DL allocations, compared to the serving cell in the specific frequency.

Figure 19:
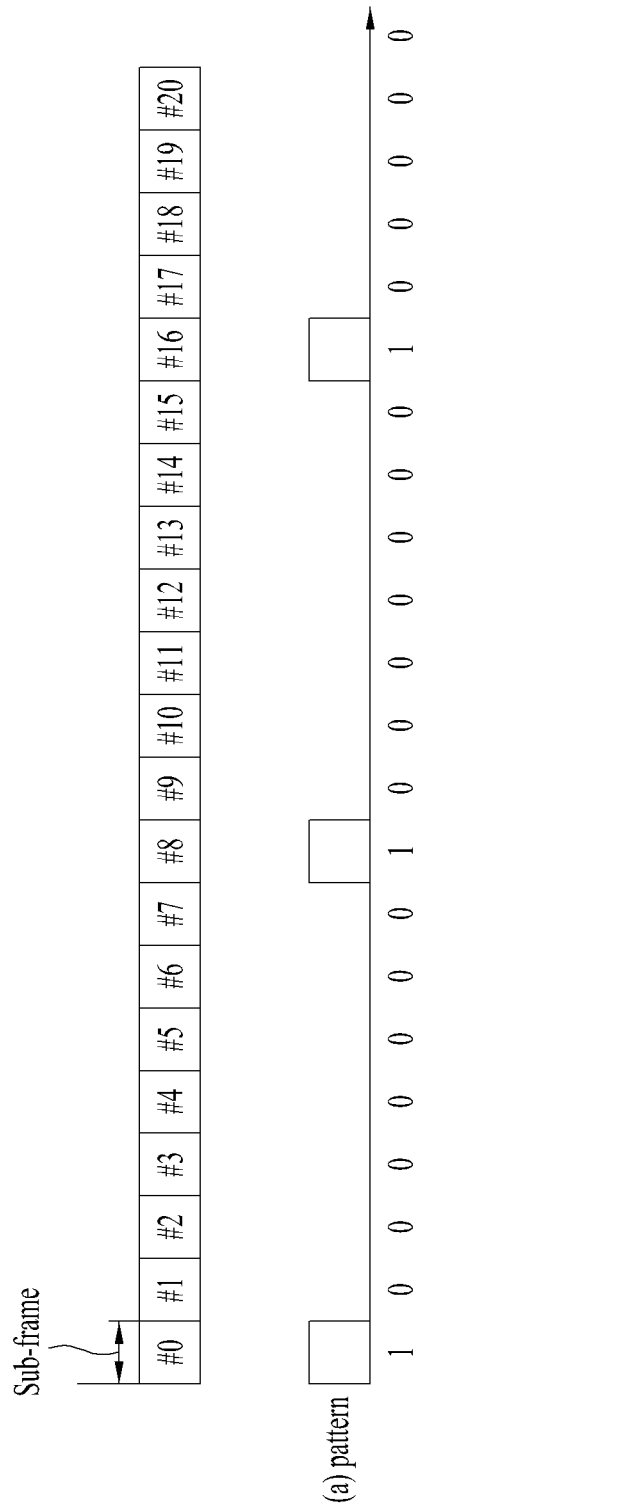
FIG. 19 illustrates an exemplary time-domain measurement resource restriction pattern.

FIG. 19 illustrates an exemplary time-domain measurement resource restriction pattern.

Referring to FIG. 19(a), the time-domain measurement resource restriction pattern (i.e. measSubframePatternPCell or measSubframePatternNeigh) may indicate subframes on which restriction is or is not imposed for measurements of the UE 100. Subframes on which restriction is imposed and thus which are not available for measurement may be represented as 1s and subframes on which restriction is not imposed and thus which are available for measurement may be represented as 0s.

Figure 20:
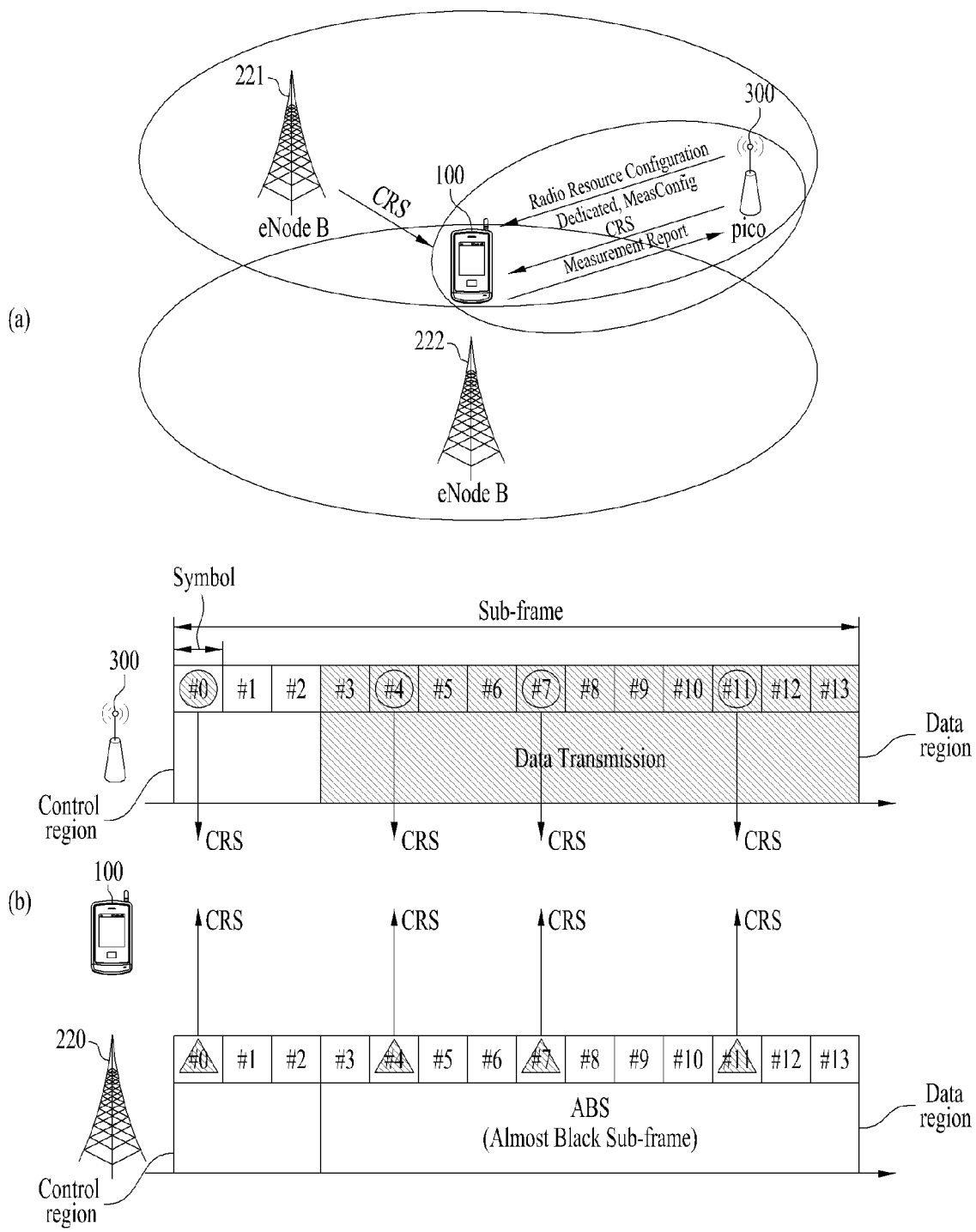
FIG. 20 illustrates an example of measuring RSRP and RSRQ.

FIG. 20 illustrates exemplary RSRP and RSRQ measurements.

Referring to FIG. 20(a), the UE 100 is located within the coverages of the picocell 300, a first macrocell (eNode B) 221, and a second macrocell (eNodeB) 222. The serving cell is the picocell 300 and the neighbor cells are the first and second macrocells (eNode Bs) 221 and 222.

FIG. 20(b) illustrates a subframe configured as an MBSFN subframe by the picocell 300. When the picocell 300 configures the corresponding subframe as an MBSFN subframe and indicates the MBSFN subframe to the first and second macrocells (eNode Bs) 221 and 222 via X2 interfaces, the first and second macrocells (eNode Bs) 221 and 222 use the corresponding subframe as an ABS.

The picocell 300 transmits data in the data region of the subframe and CRSs in the control region and data region of the subframe. The CRSs are transmitted in symbols 0, 4, 7, and 11. Since the first and second macrocells (eNode Bs) 221 and 222 use the corresponding subframe as an ABS, they transmit no data in the data region of the subframe, thereby preventing interference. Notably, the first and second macrocells (eNode Bs) 221 and 222 transmit CRSs in symbols 0, 4, 7 and 11 or in symbol 0 according to a non-MBSFN ABS or an MBSFN ABS.

As described before, the UE 100 receives a Radio Resource Configuration Dedicated IE and Measurement Config from the picocell 300.

The Radio Resource Configuration Dedicated IE includes measSubframePattern-Serv and the Measurement Config includes neighCellConfig providing information about the configurations of neighbor cells, measSubframePatternNeigh specifying a time-domain measurement resource restriction pattern for neighbor cell RSRP and RSRQ measurements, and measSubframeCellList indicating a list of cells to which the measSubframePatternNeigh is applied, as described before.

To measure the serving cell, that is, the picocell 300, the UE 100 checks the measSubframePattern-Serv. If a restriction pattern is applied to a subframe indicated by the measSubframePattern-Serv, the UE 100 receives CRSs in symbols 0, 4, 7, and 11 of the illustrated subframe from the serving cell, that is, the picocell 300 and measures the received CRSs.

Meanwhile, the UE checks the Measurement Config to measure the neighbor cells, that is, the first and second macrocells 221 and 222. It is assumed that the measSubframePatternNeigh included in the Measurement Config indicates the subframe illustrated in FIG. 20(b) as a subframe to which a neighbor cell measurement restriction is applied and the measSubframeCellList included in the Measurement Config indicates the first and second macrocells 221 and 222 as cells to which the restriction is applied.

If the neighbor cell configuration information, that is, the neighCellConfig is set to '01', the UE 100 may determine that none of the neighbor cells have an MBSFN configuration and thus may receive CRSs in symbols 0, 4, 7 and 11 of the subframe from the neighbor cells, that is, the first and second macrocells 221 and 222 and measure the neighbor cells using the CRSs.

Meanwhile, if the neighbor cell configuration information, that is, the neighCellConfig is set to '00', the UE 100 may not be aware which cell between the neighbor cells, that is, the first and second macrocells 221 and 222 has the same MBSFN configuration as the serving cell. That is, the UE 100 may determine from the neighbor cell configuration information that some neighbor cell has the same MBSFN configuration as the serving cell, but may not identify the very neighbor cell between the first and second macrocells 221 and 222, as noted from [Table 7].

Accordingly, the UE 100 may not determine which macrocell between the first and second macrocells 221 and 222 operates in the illustrated subframe in an MBSFN manner. Although the UE 100 is not sure whether the first macrocell 221 configures the illustrated subframe as an MBSFN subframe, the UE 100 has confirmed that the measSubframeCellList indicates the restriction pattern being applied to the first macrocell 221 and the measSubframePatternNeigh indicates the subframe illustrated in FIG. 20(b) as a subframe to which a neighbor cell measurement restriction is applied. Thus, the UE 100 should perform measurements using only a CRS received in the first symbol of the illustrated subframe from the first or second macrocell 221 or 222.

In other words, when the UE 100 is to receive a CRS in the illustrated subframe from the first macrocell 221 and measure the CRS, the UE receives only one CRS in the first symbol of the illustrated subframe and measures the received CRS according to the restriction pattern, although it is not certain whether the first macrocell 221 has configured the illustrated subframe as an MBSFN subframe.

However, if measurements are performed using only one CRS in a subframe, the measurements should be done across a plurality of subframes to maintain the same performance, thereby lengthening a measurement time. In addition, time required for the measurements is increased in the period of the measSubframePattern. Moreover, since the CRS in the first symbol of the subframe has a high interference level, performance is degraded.

As described above, it is difficult to satisfy the requirements for RSRP accuracy with a single CRS in a subframe. The RSRP accuracy may be considered in terms of absolute accuracy and relative accuracy, which will be described below in detail.

The requirements for absolute accuracy apply to a cell operating in the same frequency as the serving cell, when a time-domain measurement resource restriction pattern is used.

If CRSs are transmitted in the measured cell through 1, 2 or 4 antenna ports, the requirements for absolute accuracy are given as follows:

$RSRPl_{dBm} \geq -127$ dBm for bands 1, 4, 6, 10, 11, 18, 19, 21, 24, 33, 34, 35, 36, 37, 38, 39, 40, 42, 43;
$RSRPl_{dBm} \geq -126$ dBm for bands 9, 41;
$RSRPl_{dBm} \geq -125$ dBm for bands 2, 5, 7; and
$RSRPl_{dBm} \geq -124$ dBm for bands 3, 8, 12, 13, 14, 17, 20.

The above conditions can be tabulated as follows.

TABLE 8

| Parameter | Unit | Accuracy [dB] | | Conditions[1,2] | | | |
|---|---|---|---|---|---|---|---|
| | | Normal condition | Extreme condition | Bands 1, 4, 6, 10, 11, 18, 19, 21, 24, 33, 34, 35, 36, 37, 38, 39, 40, 42, 43 Io | Bands 2, 5, 7 Io | Bands 3, 8, 12, 13, 14, 17, 20 Io | Bands 9, 41 Io |
| RSRP for Es/Iot ≥ [−4] dB | dBm | ±6 | ±9 | −121 dBm/15 kHz ... −70 dBm/BW$_{channel}$ | −119 dBm/15 kHz ... −70 dBm/BW$_{channel}$ | −118 dBm/15 kHz ... −70 dBm/BW$_{channel}$ | −120 dBm/15 kHz ... −70 dBm/BW$_{channel}$ |

TABLE 8-continued

| | | Accuracy [dB] | | Conditions[1,2] | | | |
|---|---|---|---|---|---|---|---|
| Parameter | Unit | Normal condition | Extreme condition | Bands 1, 4, 6, 10, 11, 18, 19, 21, 24, 33, 34, 35, 36, 37, 38, 39, 40, 42, 43 Io | Bands 2, 5, 7 Io | Bands 3, 8, 12, 13, 14, 17, 20 Io | Bands 9, 41 Io |
| RSRP for Es/Iot ≥ [−4] dB | dBm | ±8 | ±11 | −70 dBm/BW$_{channel}$ ... −50 dBm/BW$_{channel}$ | −70 dBm/BW$_{channel}$ ... −50 dBm/BW$_{channel}$ | −70 dBm/BW$_{channel}$ ... −50 dBm/BW$_{channel}$ | −70 dBm/BW$_{channel}$ ... −50 dBm/BW$_{channel}$ |

Io is defined over REs in subframes indicated by the time-domain measurement resource restriction pattern configured for performing RSRP measurements of this cell.

Like the requirements for absolute RSRP accuracy, the requirements for relative accuracy apply to a cell operating in the same frequency as the serving cell, when a time-domain measurement resource restriction pattern is used.

If CRSs are transmitted in the measured cell through 1, 2 or 4 antenna ports, the requirements for absolute accuracy are given as follows:

RSRP1,21$_{dBm}$ ≥ −127 dBm for bands 1, 4, 6, 10, 11, 18, 19, 21, 24, 33, 34, 35, 36, 37, 38, 39, 40, 42, 43;

RSRP1,21$_{dBm}$ ≥ −126 dBm for bands 9, 41;

RSRP1,21$_{dBm}$ ≥ −125 dBm for bands 2, 5, 7; and

RSRP1,21$_{dBm}$ ≥ −124 dBm for bands 3, 8, 12, 13, 14, 17, 20.

dBm is a unit representing Watt and 1 mW=0dBm.

The above-described requirements for absolute RSRP accuracy and relative RSRP accuracy are difficult to satisfy by use of a single CRS. Accordingly, there is a need for a method for more efficiently measuring RSRP/RSRQ. Hereinbelow, such a method will be described.

Figure 21:
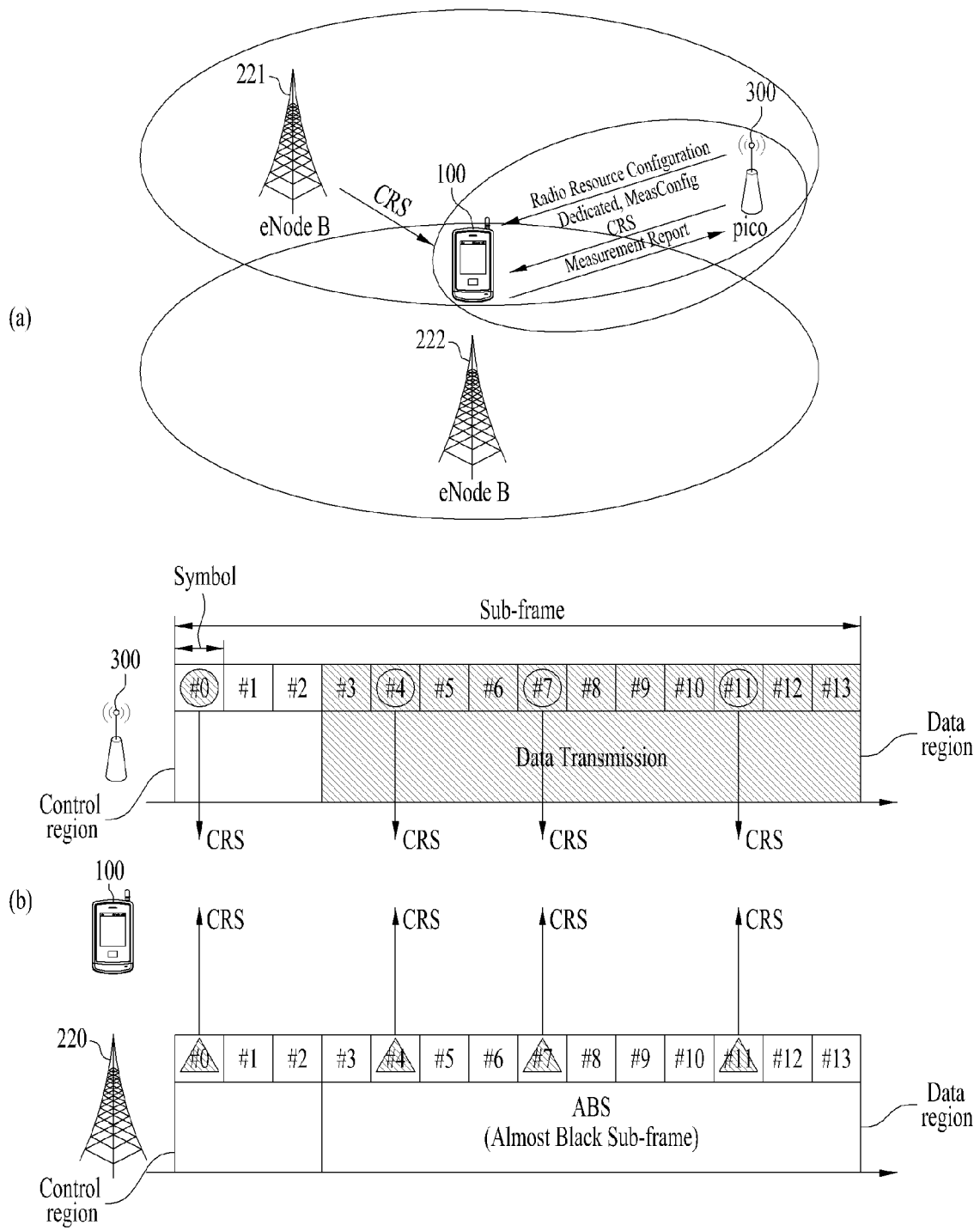
FIG. 21 illustrates a more efficient measurement method.

FIG. 21 illustrates a more efficient measurement method.

A description of FIG. 21 is mostly similar to that of FIG. 20. Therefore, only the difference between FIGS. 20 and 21 and will be described.

The difference lies in that if the MBSFN configuration of the macrocell 221 is not known or not explicitly indicated (i.e. which cell between the neighbor cells, that is, the first and second macrocells 221 and 222 has the same MBSFN configuration as the serving cell is not known) due to the neighbor cell configuration information, that is, the neighCellConfig set to '00', the UE 100 performs measurements, considering that no MBSFN subframe is configured in the first macrocell 221 even though a subframe on which restriction is imposed according to the measSubframePatternNeigh is applied to the first macrocell 221 according to the measSubframeCellList.

In other words, when the UE 100 is not sure whether the illustrated subframe has been configured as an MBSFN subframe by the first macrocell 221, it receives CRSs in a plurality of symbols (e.g. symbols 0, 4, 7 and 11) in the subframe although restriction is imposed on the subframe, considering that the first macrocell 221 has not configured the subframe as an MBSFN subframe. Consequently, the afore-mentioned accuracy requirements can be satisfied.

To achieve the effects, the afore-described contents may be partially modified.

In one modification example, the serving cell 300 may configure a subframe to which a restriction pattern is applied as a normal subframe, not an MBSFN subframe and may include only information about cells that have configured the subframe as a normal subframe in measSubframeCellList. Then, the UE 100 performs measurements on cells listed in the measSubframeCellList in a normal manner because the subframe on which restriction is imposed is a normal subframe. For non-restriction subframes which are MBSFN subframes, the UE performs RSRP/RSRQ measurements using the first CRS.

In another modification example, the serving cell 300 configures a subframe to which a restriction pattern is applied as a normal subframe, not an MBSFN subframe. Therefore, despite the presence of any neighbor cell configuring the subframe as an MBSFN subframe, the UE 100 performs RSRP/RSRQ measurements, assuming that the corresponding subframe of the corresponding cell is a normal subframe, not an MBSFN subframe.

In a third modification example, the serving cell restricts RSRP/RSRQ measurements of the UE to normal subframes, not MBSFN subframes. Normal subframes are subframes 0, 4, 5 and 9 in FDD and subframes 0, 1, 5 and 6 in TDD. Thus the UE performs RSRP/RSRQ measurements only in the normal subframes according to the restriction.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Figure 22:
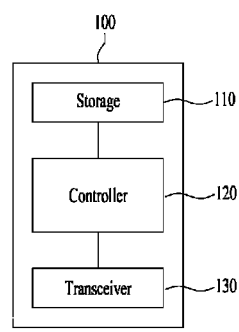
FIG. 22 is a block diagram of a UE 100 according to an embodiment of the present invention.

FIG. 22 is a block diagram of the UE 100 according to the present invention.

Referring to FIG. 22, the UE 100 includes a storage 110, a controller 120, and a transceiver 130.

The storage 110 stores the methods illustrated in FIGS. 10 to 21.

The controller 120 controls the storage and the transceiver. Specifically, the controller executes the methods stored in the storage. When the controller is allocated to RBs for multi-cluster transmission in a CC and receives an NS value from an eNode B through the transceiver, the controller transmits a signal by limiting maximum transmission power according to an MPR indicated by the NS value.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it is obvious to those skilled in the art that claims that are not explicitly cited in each other in the appended claims may be presented in combination as an embodiment of the present invention or included as a new claim by a subsequent amendment after the application is filed.

Industrial Applicability

The present invention is applicable to a UE, an eNode B, or other equipment in a wireless mobile communication system.

The invention claimed is:

1. A cell measurement method of a User Equipment (UE), the method comprising:
receiving a radio resource configuration dedicated Information Element (IE) and a measurement object from a serving cell,
wherein the radio resource configuration dedicated IE includes first information about a measurement resource restriction pattern for a first cell,
wherein the measurement object includes a neighbor cell configuration IE for indicating multimedia broadcast multicast services (MBMS) Single Frequency Network (MBSFN) configurations of one or more neighbor cells, and
wherein the measurement object further includes second information about a resource restriction pattern indicating subframes on which a restriction is imposed in Reference Signal Received Power (RSRP) and Reference Signal Received Quality (RSRQ) measurements of one or more neighbor cells and a list of one or more neighbor cells to which the second information is applied;
determining, if the MBSFN configurations of the one or more neighbor cells are not known or not explicitly indicated by the neighbor cell configuration IE, that the subframes indicated by the second information have not been configured as MBSFN subframes for the one or more neighbor cells listed in the list,
receiving a plurality of Common Reference Signals (CRSs) in Orthogonal Frequency Division Multiplexing (OFDM) symbols #0, #4, #7, and #11 of a subframe determined not to have been configured as an MBSFN subframe; and
measuring one or more of RSRP and RSRQ using the CRSs received in the OFDM symbols #0, #4, #7, and #11 of the subframe.

2. The method according to claim 1, wherein the first information is measSubframePattern-Serv, the second information is measSubframePattern-Neigh, the list is measSubframeCellList, or the neighbor cell configuration IE is neighCellConfig.

3. The method according to claim 1, wherein the second information about the resource restriction pattern is set to indicate only normal subframes, not MBSFN subframes.

4. The method according to claim 3, wherein the normal subframes are subframes 0, 4, 5, and 9 in Frequency Division Duplex (FDD) and subframes 0, 5 and 6 in Time Division Duplex (TDD).

5. The method according to claim 1, wherein the measurement object is included in Measurement Config.

6. The method according to claim 1, wherein the radio resource configuration dedicated IE and the measurement object are received in a Radio Resource Control (RRC) connection reconfiguration message.

7. The method according to claim 1, wherein if the second information is not included, it is determined that restriction is imposed on all neighbor cells.

8. A User Equipment (UE) for cell measurement, comprising:
a receiver configured to receive a radio resource configuration dedicated Information Element (IE) and a measurement object from a serving cell,
wherein the radio resource configuration dedicated IE includes first information about a measurement resource restriction pattern for a first cell,
wherein the measurement object includes a neighbor cell configuration IE for indicating multimedia broadcast multicast services (MBMS) Single Frequency Network (MBSFN) configurations of one or more neighbor cells, and
wherein the measurement further includes second information about a resource restriction pattern indicating subframes on which a restriction is imposed in Reference Signal Received Power (RSRP) and Reference Signal Received Quality (RSRQ) measurements of one or more neighbor cells and a list of one or more neighbor cells to which the second information is applied; and
a controller configured to determine, if the MBSFN configurations of the one or more neighbor cells are not known or not explicitly indicated by the neighbor cell configuration IE, that the subframes indicated by the second information have not been configured as MBSFN subframes for the one or more neighbor cells listed in the list,
wherein if the controller determines a subframe not to have been configured as an MBSFN subframe, the receiver receives a plurality of Common Reference Signals (CRSs) in Orthogonal Frequency Division Multiplexing (OFDM) symbols #0, #4, #7, and #11 of the subframe, and the controller measures one or more of RSRP and RSRQ using the CRSs received in the OFDM symbols #0, #4, #7, and #11 of the subframe.

9. The UE according to claim 8, wherein the first information is measSubframePattern-Serv, the second information is measSubframePattern-Neigh, the list is measSubframeCellList, or the neighbor cell configuration IE is neighCellConfig.

10. The UE according to claim 8, wherein the second information about the resource restriction pattern is set to indicate only normal subframes, not MBSFN subframes.

11. The UE according to claim 10, wherein the normal subframes are subframes 0, 4, 5, and 9 in Frequency Division Duplex (FDD) and subframes 0, 5 and 6 in Time Division Duplex (TDD).

12. The UE according to claim 8, wherein the measurement object is included in Measurement Config.

13. The UE according to claim 8, wherein the radio resource configuration dedicated IE and the measurement object are received in a Radio Resource Control (RRC) connection reconfiguration message.

* * * * *